Figure 1:
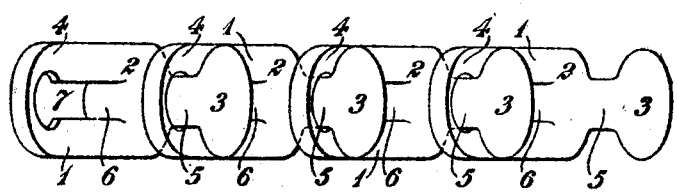

Dec. 8, 1925.

A. H. F. PERL ET AL 1,564,711

CHAIN, BELT, AND THE LIKE

Filed Oct. 30, 1923   3 Sheets-Sheet 1

Inventors
A. H. F. Perl
and
R. H. Carter
By
Att'y

Dec. 8, 1925.  1,564,711
A. H. F. PERL ET AL
CHAIN, BELT, AND THE LIKE
Filed Oct. 30, 1923   3 Sheets-Sheet 2
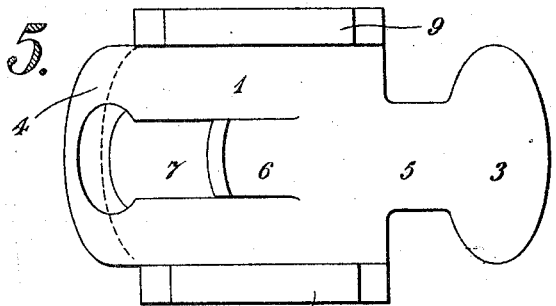
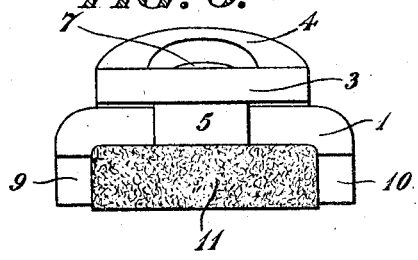
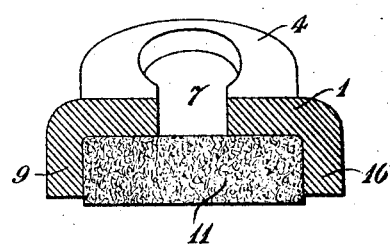
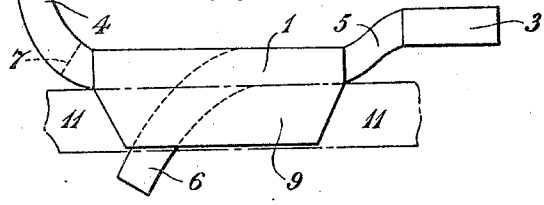
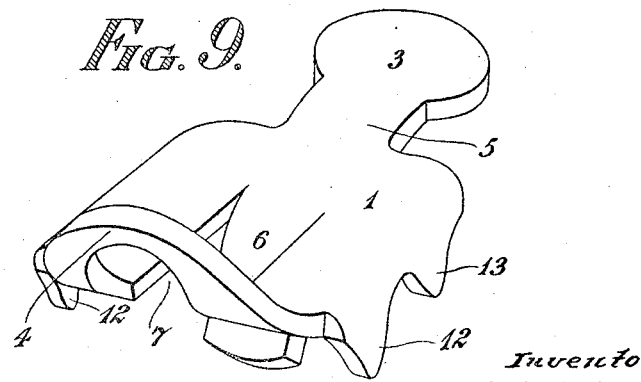
Inventor
A.H.F. Perl
R.H. Carter
By [signature]
Atty

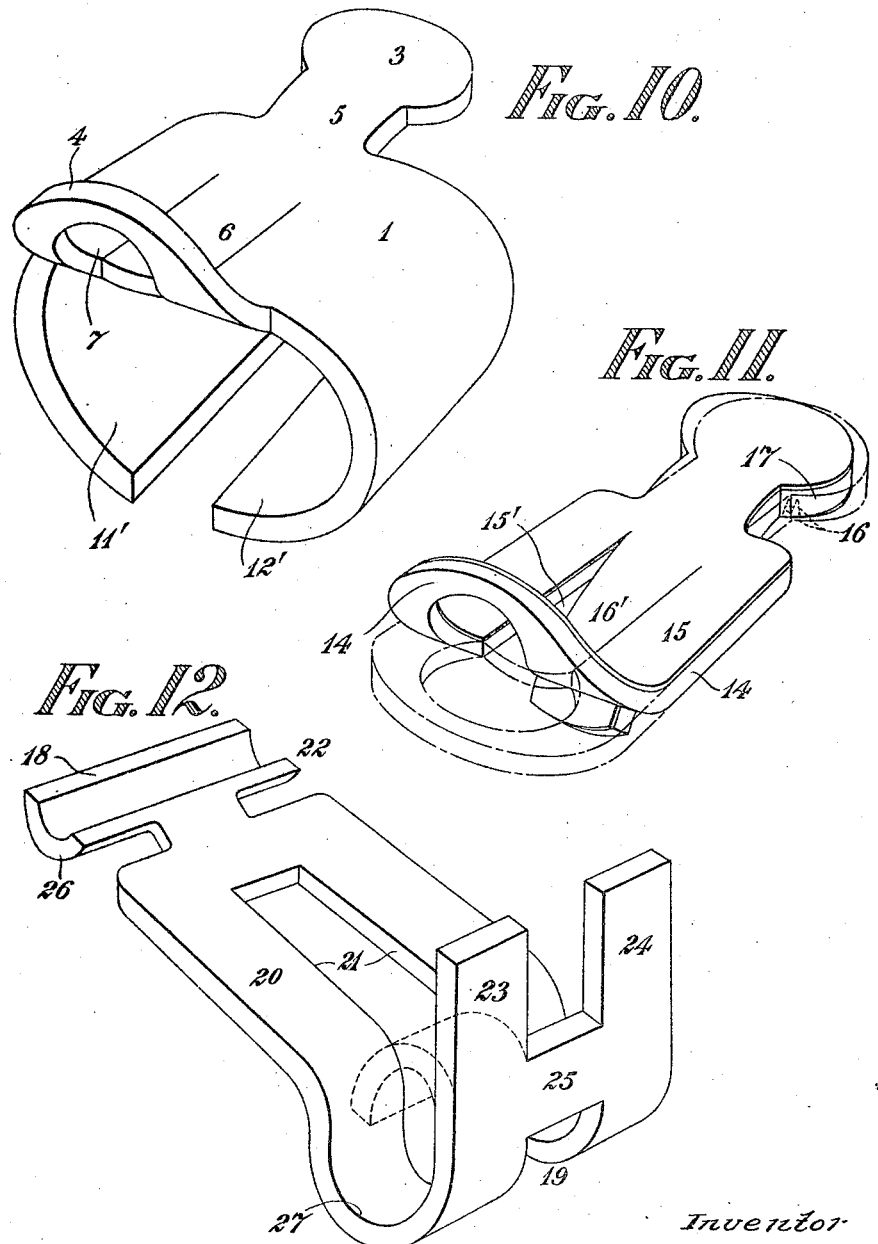

Patented Dec. 8, 1925.

1,564,711

UNITED STATES PATENT OFFICE.

ALBERT HENRY FRANKS PERL AND RICHARD HEMMINGS CARTER, OF LONDON, ENGLAND.

CHAIN, BELT, AND THE LIKE.

Application filed October 30, 1923. Serial No. 671,796.

*To all whom it may concern:*

Be it known that we, ALBERT HENRY FRANKS PERL and RICHARD HEMMINGS CARTER, subjects of the King of England, residing at London, England, have invented certain new and useful Improvements in or Relating to Chains, Belts, and the like, of which the following is a specification.

This invention relates to links for use in the manufacture of chains, belt and the like, the said links being of the one-piece type having one end of T-shaped form and a slot in the body of the link. In such constructions, the links which are duplicates are assembled by passing the T-shaped end through the slot in the body of the link and subsequently turning the link into the correct position to form the chain, belt and the like. Such links, however, when assembled in the form of a chain, belt and the like, are apt to become disengaged from one another, thus resulting in considerable inconvenience when assembling the links into the form of a chain, belt and the like. The present invention has for its object to provide an improved construction of link for use in making chains, belt and the like, the said link being provided with means which prevent the links from becoming accidentally disengaged from one another, the said links being, however, readily and quickly attachable to one another to form a chain, belt and the like of any desired length.

According to the present invention the body of the link is provided with a key-hole slot, means being also provided to engage the rectilineal portion of the key-hole slot or any desired part thereof so as to prevent the links from becoming accidentally disengaged from one another. One end of each link is provided with a projection of any suitable form such, for example, as a T-shaped projection by means of which one link can be engaged with an adjacent link. In order to prevent the links from becoming automatically or accidentally disengaged from each other, opposite ends of the links are curved to one side of the link so that after the T-shaped projection has been engaged with an adjacent link, the curvature of the ends of the link may prevent the links associated therewith becoming detached or disengaged. Each link is provided with a tongue or slot of such shape as to offer a positive resistance to prevent the cooperating link from becoming disengaged. Each link may be stamped from a separate blank or from a strip of suitable material or from a sheet of metal of any desired size. Each link which may be serrated on either side or on both sides may be cupped or turned over at the ends or sides or at both the ends and sides to provide a means of holding non-slipping or shock absorbent material or sound deadening material or a lubricating medium or other desired material. If so desired, a link may have either side or both sides provided with a projecting portion or portions of suitable form and preferably in one with the body of the link so that such projection or projections may be used as a tooth or teeth for driving or other purposes.

In a preferred form of link, the link is provided with an opening or slot of any desired length and the ends of each link, after the desired number of links have been engaged, are curved inwardly so as to prevent the links becoming disengaged. The slot in the link may be of rectangular form or may be of a form somewhat similar to that of the key-hole slot. The several links or any desired number thereof may be so shaped as to retain a filling of non-slipping material such as cloth, fabric, composition or other desired material which will prevent the chain slipping when used, for example, as a driving belt. Each link may be provided with a cup-shaped rearwardly extending portion adapted to hold the aforesaid non-slipping material.

In order that the invention may be clearly understood reference is made to the accompanying drawing which shews constructions of chains, belts and the like in accordance with the present invention.

Figure 2:
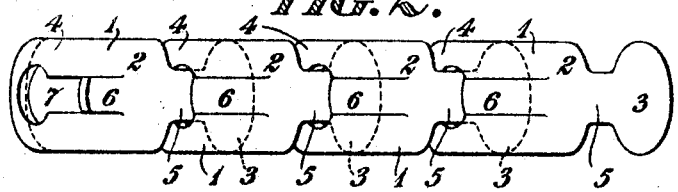

Figure 1, drawn to an enlarged scale, is a plan view of the chain, belt and the like in accordance with the present invention, and Figure 2 is an inverted plan view thereof.

Figure 3:
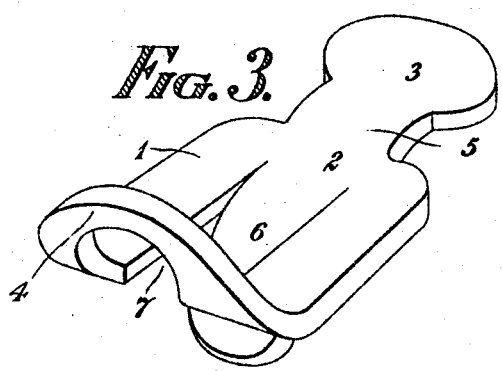

Figure 3, drawn to an enlarged scale, is a perspective view of a single link.

Figure 4:
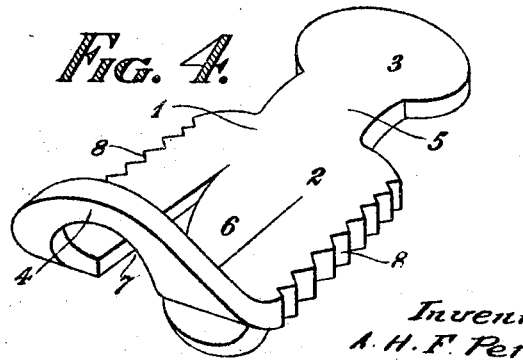

Figure 4, drawn to an enlarged scale, is a perspective view of a single link shewing a modified form of link.

Figures 5, 6, 7 and 8, drawn to an enlarged scale, shew a plan, an end view, a section and a side view respectively of a modified form of link.

Figures 9 and 10, drawn to an enlarged scale, are perspective views of further modified forms of links.

Figure 11, drawn to an enlarged scale, shews a link made of leather and provided on one face with a metal cover.

Figure 12, drawn to an enlarged scale, shews a further modified form of link in which the two ends are more or less of semi-circular form.

Referring to Figures 1, 2 and 3 of the drawing, each link 1, of which the chain is composed, is formed in one piece. One end 2 of each link is provided with a projection of any suitable form, such for example, as a T-shaped projection 3 by means of which one link can be engaged with an adjacent link. In order to prevent the links from becoming automatically or accidentally disengaged from each other, opposite ends of the links are curved to one side of the link, as shewn at 4, 5 so that after the T-shaped projection has been engaged with an adjacent link the curvature of the ends of the link may prevent the links associated therewith becoming detached or disengaged. Each link 1 is provided with a tongue 6 and slot 7, the tongue 6 offering when closed, a positive resistance to prevent the co-operating link from becoming disengaged. Each link may be stamped from a separate blank or from a strip of suitable material or from a sheet of metal of any desired size. Each link 1 which may be serrated on either edge or on both edges, as shewn at 8, Figure 4, may be cupped or turned over at the sides, as at 9, 10 (Figures 6 and 7) to provide a means of holding nonslipping material 11 or shock absorbent material or sound deadening material or a lubricating medium or other desired material; or the sides may be turned over to make an approximately tubular form of link as at 11′, 12′, Figure 10. Each link may be provided on its under side with transversely arranged serrations so as to provide a gripping means when a number of links are assembled to form a driving belt or the equivalent. Each link may be made of leather as shewn at 14 in Figure 11 and provided with a curved metal covering 15 having a key-hole slot 15′ and a tongue 16′. Each leather link is flat but such link assumes a more or less curved form on interengagement with an adjacent metal covered link by reason of the fact that the metal covering is of curved form itself. The metal covering 15 may be turned round and simply pressed against the leather as shewn in Figure 11 or may have serrated edges as at 16 at the end of the turned over part which serrations may be driven into the under face of the T-shaped portion 17 so as to retain the metal covering 15 in position or, if desired tongues may be stamped from the metal covering 15 and forced into the leather link so as to retain the metal covering in position.

If so desired each link may have either side or both sides provided with a projecting portion or portions of suitable form and preferably in one with the body of the link so that such projection or projections may be used as a tooth or teeth, as shewn at 12, 13 for driving or other purposes. By suitably bending the ends of each link in opposite directions, freedom of movement can be obtained in two directions when a number of such links are assembled to form a chain, belt and the like. Further, by twisting either end of the link, whether the T-shaped end or the opposite ends, into a plane at right angles to the body of the link, flexibility can be obtained in four directions when a number of such links are assembled to form a chain, belt and the like.

The external contour of the link, apart from the T-shaped projection may be square, rectangular, or of other suitable shape and the outer edge of the T-shaped projection 3 is preferably rounded so as to afford sufficient play to the links when engaged. In making a link from an individual blank or from a strip or sheet of suitable metal, the link is stamped with the T-shaped projecting portion 3 tongue 6 and the hole or slot 7 hereinbefore mentioned. Thereafter the link is given a curvature towards one side, as at 4, 5 and at the same time the tongue such as 6 is pressed backwardly from the link. In forming the chain the T-shaped projecting portion 3 of a link produced as above is engaged in the hole or slot 7 in an adjacent co-operating link 1 and longitudinally thereof. The T-shaped projection 3, including a link 1 of which such projection forms a part, is thereafter twisted round in the opening or slot 7 and the tongue 6 of the preceding link is forced into the slot 7 of the aforesaid link so as to leave a more or less flush surface at the back of the link, as shewn in Figure 2. The tongue 6 so closed prevents the co-operating link from being disengaged either automatically and accidentally. If desired the link may be formed with the slot 7 but without the tongued portion 6. Further, the rectangular portion of the key-hole slot may be closed either by the aforesaid tongue 6 or by a piece of metal suitably secured in the said rectangular portion of the key-hole slot.

Figure 11 shews a perspective view of a metal link having approximately semicircular ends 18, 19, the body of the link being indicated at 20, and the slot therein at 21. The semi-circular end 16 is T-shaped and is of smaller radius than the semi-circular end 19. 22 is the T-shaped portion and 23, 24 are two upstanding projections formed on the opposite end of the semi-circular portion 19. These two upstanding projections are connected by a crosspiece 25. In assembling links of this form the semi-circular T-shaped portion 18 is inserted into the slot 21. The T-shaped portion 18 is then manipulated into a position such that the lower face 26 of the semi-circular T-shaped portion rests on the inner surface 27 of the semi-circular portion 19. The upstanding projections 23 and 24 are then bent over into the position shewn in dotted lines in Figure 12 so as to retain the semi-circular T-shaped portion 18 in position.

The links of the chain or belt may be made of metal, celluloid, vulcanite, ebony, leather or any other desired material, it being understood, however, that when the links are made of leather (without a metal covering) or other flexible material, the opening in each link would preferably be formed by two slits disposed at right angles to each other, instead of an opening of rectangular or keyhole slot formation as hereinbefore explained.

What we claim is:—

1. As a new article of manufacture, a one-piece link having the body of the link formed with a key hole slot to permit the attachment thereto of a companion link, said body being provided with means capable of movement to close a portion of said slot to prevent the separation of the companion link following its attachment.

2. As a new article of manufacture, a one-piece link having a body portion formed with a key hole slot, the said body including a tongue movable to a position to open the key hole slot, whereby to permit of the attachment thereto of a companion link or to a position to close part of the key hole slot whereby to prevent separation of an attached link.

3. As a new article of manufacture, a one-piece link in accordance with claim 1 which link is adapted to engage a similar or duplicate link and the opposite sides of the said link being bent sidewise and provided with means whereby a plurality of such links when assembled to the desired length can be used as a means for the transmission of power.

4. As a new article of manufacture, a link in accordance with claim 1, wherein the link is bent or curved outwardly at either end or at both ends thereof.

5. As a new article of manufacture, a link in accordance with claim 1, wherein the end of the link provided with the circular portion of the tongued key-hole slot is curved outwardly, the T-shaped projecting portion or the other end of the link being bent outwardly and then into a plane which is approximately parallel to the body of the link.

6. As a new article of manufacture, a link in accordance with claim 1, characterized in that the said link is made of leather and provided at one side with a metal covering having a turned up or curved portion at one end, a through-way slot in the body of the metal covering and an upstanding projection in the said through-way slot, the contour of the said metal covering conforming to the contour of the leather link.

7. As a new article of manufacture, a link formed with a slot and including a T-shaped projection at one end, that end of the link opposite the T-shaped projection being of approximately semi-circular form and of a size to receive the T-shaped projection of a companion link, the end of semi-circular form having upstanding projections adapted to be bent down to retain the T-shaped portion of the adjacent link when in position in said semi-circular portion.

8. A chain, belt and the like, formed of a plurality of interconnected similar or duplicate links, each of which is in one piece, each link being provided in the body thereof with a key-hole slot and with a T-shaped projection at one end, the T-shaped projection of one link being arranged to cooperate with the key hole slot of the adjacent link, each link having a tongue to partially close the key hole slots thereof following the insertion of the T-shaped projection of the adjacent link.

In the testimony whereof we have hereunto signed our names.

ALBERT HENRY FRANKS PERL.
RICHARD HEMMINGS CARTER.